United States Patent [19]

Jenkins et al.

[11] 4,107,397
[45] Aug. 15, 1978

[54] ELECTRO-CHEMICAL CELLS

[75] Inventors: Jonathan Moubray Jenkins, Sevenoaks; Kenneth Henson, Ramsbottom, both of England

[73] Assignee: Unigate Limited, London, England

[21] Appl. No.: 691,812

[22] Filed: Jun. 1, 1976

Related U.S. Application Data

[63] Continuation of Ser. No. 500,763, Aug. 26, 1974.

[30] Foreign Application Priority Data

Aug. 24, 1973 [GB] United Kingdom .............. 40299/73

[51] Int. Cl.² ...................... H01M 4/96; H01M 10/00
[52] U.S. Cl. ................................................. 429/27
[58] Field of Search .................... 429/15, 17, 19, 21, 429/229, 27

[56] References Cited

U.S. PATENT DOCUMENTS

| | | | |
|---|---|---|---|
| 3,214,296 | 10/1965 | Smatko | 429/254 |
| 3,382,102 | 5/1968 | Zeto | 429/229 |
| 3,427,206 | 2/1969 | Scardaville | 429/254 |
| 3,684,580 | 8/1972 | Lysaght | 429/254 |
| 3,809,578 | 5/1974 | Symons | 429/101 |

*Primary Examiner*—John H. Mack
*Assistant Examiner*—H. A. Feeley
*Attorney, Agent, or Firm*—Sughrue, Rothwell, Mion, Zinn and Macpeak

[57] ABSTRACT

A rechargeable zinc halogen cell or battery comprising a casing defining one or more electrode compartments, a number of halogen storage carbon/metal cathodes mounted in each compartment and interspaced with one or more zinc bearing anodes, a halogen gas inlet to the casing and communicating with an open portion of each cathode to form a common channel for the gas in the cell, and disposed between each cathode and anode a semi-permeable separator which will not allow any substantial passage therethrough of the halogen in liquid form.

3 Claims, No Drawings

ELECTRO-CHEMICAL CELLS

This is a Continuation, of application Ser. No. 500,763, filed Aug. 26, 1974.

BACKGROUND OF THE INVENTION

1. Field of the Invention

This invention relates to electro-chemical cells and batteries and more particularly to zinc halogen cells and a construction of such cells and batteries is described in the United Kingdom Letters Pat. Specification No. 1,258,502.

2. Description of Prior Art

U.S. Pat. No. 1,258,502 claims an electrode structure for a rechargeable zinc halogen cell comprising a substrate of anodizable metal selected from the metals of Group IV(A) or Group V(A) of the Periodic Table according to Mendeleef having permanently associated therewith at least one coherent stratum of substantially porous carbon. The electrode is produced by pressing a mixture of the porous carbon and a particulate binder onto the substrate at a pressure of at least 2 tons p.s.i. A halogen storage electrode comprises at least two spaced electrode structures as described above, preferably in plate or like form, joined together along one, two or three edges, and a covering of synthetic resin material inert to the halogen secured in a gas-tight manner round the edges leaving the surface of the carbon stratum free and leaving one end of the electrode open to permit gas access to the enclosed space between the electrode structures, provision being made for an electrical connection to the metal substrate.

A suitable electrode for use in the rechargeable electric zinc halogen cell or battery comprises a substrate of the anodizable metal of Group IV(A) or V(A) of open mesh, apertured, expanded metal or porous metal form coated with zinc or a zinc salt or an alloy containing zinc, mercury, indium or gallium.

Moreover, our co-pending Application No. 40297/73 discloses improvements in such cells in which inter alia the halogen e.g. chlorine electrode is sealed to provide a pressure differential across the electrode. The halogen may however be bromine or iodine.

The rechargeable cell or battery of such cells may comprise a casing with titanium end walls and titanium walls separating electrode compartments in the casing, a number of chlorine storage carbon/metal electrodes mounted between two consecutive titanium walls interspaced with zinc bearing electrodes, and a halogen gas inlet to the casing and communicating with the open bottom portions of the carbon/metal electrodes which form a common channel for the gas in the cell, the carbon/metal electrodes and the zinc bearing electrodes being electrically connected respectively to positive and negative poles of the cell or battery. The cell or battery is in a halogen gas circuit including a halogen gas cylinder, a pressure regulator valve, an ultraviolet lamp for the removal of undesirable gases such as hydrogen from the circuit, and a halogen gas liquifier connected to the cylinder, and the lamp being in the circuit between the valve and the liquifier.

The carbon/metal electrode structure is preferably about 30 to 50% porous so that the halogen gas, preferably chlorine, stored in it acts as the cathode. The electrolyte is the chloride of the halogen used, preferably zinc chloride.

It has been found that during charging the halogen notably chlorine is evolved on the outside of the carbon/metal cathode and if this reaches the zinc bearing electrode the latter would be subject to a degree of corrosion, dendrites tend to form which shorten the life of the cell, and the pH value of the electrolyte is approximately the same throughout the cell whereas a pH difference at the cathode and anode e.g. 1.0 and 2.0 respectively is found to be advantageous.

The main object of the present invention is to provide a cell or battery of cells in which the aforesaid points can be employed at what are the present time believed to be optimum values.

It has been found that by employing a semi-permeable material in sheet form as a membrane between the cathode and the anode, the chlorine diffusion in the cell is reduced, the pH value of the electrolyte can be maintained at desirable and different values adjacent to the cathode and anode and dendrite formation is reduced: the plating efficiency of the zinc bearing anode is also improved.

SUMMARY

According to the present invention a rechargeable zinc halogen cell or battery comprises a casing defining one or more electrode compartments, a number of halogen storage carbon/metal cathodes mounted in each compartment and interspaced with one or more zinc bearing anodes, a halogen gas inlet to the casing and communicating with an open portion of each cathode to form a common channel for the gas in the cell and disposed between each cathode and anode a semi-permeable separator which will not allow any substantial passage therethrough of the halogen in liquid form. By the term "halogen" herein is meant chlorine, bromine or iodine.

DESCRIPTION OF PREFERRED EMBODIMENTS

The separator is preferably in sheet form and so shaped and built into the cell, or the cells of the battery, as to prevent halogen gas, preferably chlorine, evolved at the cathode diffusing in the cell or each cell so as to contact the anode.

A suitable membrane or barrier is of the radiation, cross-graft type which is ion selective and permits the passage of the zinc and halide e.g. chloride, ions whilst preventing the passage of any dissolved halogen.

A dry film pore size in these membranes is of the order of 25 to 40 $A^0$ which is of sufficiently small size substantially to prevent the passage of halogen e.g. chlorine, molecules in solution. Examples of such membrane material are AMFION C100 made by American Machine Foundries and/or P-1010 made by RAI Corporation.

By using such a membrane it has been found possible to maintain a pH differential of 1-2 pH units between anolyte and catholyte. The zinc can thus be made resistant to any noticeable corrosion, its plating efficiency is satisfactory over substantial charging and discharging periods and the formation of dendrites on the anode is kept to acceptably low limits.

I claim:

1. In a rechargeable zinc-halogen electric cell comprising:
   (a) a casing;
   (b) storage means external to said casing for storing molecular halogen;

(c) at least one halogen electrode structure located within said casing comprising an apertured substrate consisting essentially of an anodizable metal selected from the group consisting of Groups IV(A) and V(A) of the Periodic Table according to Mendeleef having an inherent oxide layer thereon, said substrate having permanently associated therewith at least one coherent permeable stratum of a mixture of substantially porous carbon and a polymeric binder, said electrode structure having been produced by pressing said mixture of porous carbon and binder at a pressure of at least 2 tons psi onto said substrate to provide said flexible halogen electrode structure, said halogen electrode structure being adapted to provide a space therein in communication with said external storage means for molecular halogen into and through which space molecular halogen can move;

(d) at least one metal bearing anode structure located within said casing including a zinc-containing material supported on an electrically conducting substrate; and (e) positive and negative electric conductors leading from said electrode structures to terminals accessible to the outside of said casing; and casing being adapted to hold a body of liquid and flowable zinc halide electrolyte in contact with each of said electrode structures, the improvement comprising a separator between each halogen electrode structure and each anode structure, said separator permitting the passage of zinc and halogen ions therethrough but preventing the passage of halogen molecules, whereby diffusion of halogen molecules from said halogen electrode structures to said anodes is prevented and a pH differential between the anolyte and calholyte of 1-2 PH units is maintained.

2. A rechargeable zinc halogen cell according to claim 1 wherein each said separator is a membrane of the radiation cross graft type.

3. A rechargeble zinc halogen cell according to claim 1 wherein each said separator has a dry film pore size of about 25 to 40 Å.

* * * * *